(12) United States Patent
Smith

(10) Patent No.: US 8,541,530 B2
(45) Date of Patent: Sep. 24, 2013

(54) METHOD OF MANUFACTURING ARTIFICIAL SNOW

(75) Inventor: Jeremy Edward John Smith, Castleford (GB)

(73) Assignee: Custompac Limited, Castleford (GB)

(*) Notice: Subject to any disclaimer, the term of this patent is extended or adjusted under 35 U.S.C. 154(b) by 0 days.

(21) Appl. No.: 13/169,372

(22) Filed: Jun. 27, 2011

(65) Prior Publication Data

US 2012/0016099 A1 Jan. 19, 2012

(30) Foreign Application Priority Data

Jul. 1, 2010 (GB) .................................. 1011090.6

(51) Int. Cl.
  *C09K 3/24* (2006.01)
  *C08J 3/12* (2006.01)
(52) U.S. Cl.
  USPC ........................................ 526/352; 241/24.1
(58) Field of Classification Search
  USPC ................. 526/352; 239/2.2, 14.2; 241/24.1
  See application file for complete search history.

(56) References Cited

U.S. PATENT DOCUMENTS

2007/0176137 A1   8/2007   Quee et al.

FOREIGN PATENT DOCUMENTS

| BR | 9303080 | * | 4/1994 |
| BR | 93033080 A | | 4/1994 |
| DE | 195 44 509 A1 | | 11/1995 |
| DE | 19544509 | * | 6/1997 |
| WO | WO 2006/074556 A1 | | 7/2006 |

OTHER PUBLICATIONS

Gerriets International, http://www.gi-info.com/synthetic_snow_cork.html, Polyethylene Artificial Snow #4962.
Norcostco, http://www.norcostco.com/artificalsnow-2lbsbag.aspx, Polyethylene Artificial Snow.

* cited by examiner

*Primary Examiner* — Ling Choi
*Assistant Examiner* — Chun-Cheng Wang
(74) *Attorney, Agent, or Firm* — Oliff & Berridge, PLC

(57) ABSTRACT

A method of manufacturing artificial snow including the steps; a) feeding a bulk material into a first apparatus; b) reducing the particle size of the bulk material in the first apparatus to produce a product; c) sieving the product produced at step b); and d) collecting the product produced at step c) for use as artificial snow.

18 Claims, 4 Drawing Sheets

METHOD OF MANUFACTURING ARTIFICIAL SNOW

The invention relates to a method of manufacturing artificial snow. In particular, the invention relates to a method of manufacturing artificial snow comprising polyethylene material.

Artificial snow is often used in film and theatre productions to create wintery scenes. This type of snow is also used in merchandising, particularly in shop windows, to produce seasonal displays to attract the customer.

Known artificial snow products have the disadvantage that they do not look realistic. In particular, these products do not have the desired characteristics of real snow, for example, the ability to fall in a light flurry or fall as a blizzard. Furthermore, known artificial snow products are highly electrostatic. As such, positioning said snow in a desired location on a film set or in a shop window, without the snow migrating to another location, is extremely difficult and cumbersome.

Existing artificial snow products tend to be manufactured from hazardous chemicals comprising CFCs and HCFCs. In addition to being harmful to the environment, such products are flammable and so their use on, for example, a film set, is limited to minimise the risk of fire.

It is an object of the present invention to overcome the above mentioned problems associated with the prior art.

According to a first aspect of the present invention, there is provided a method of manufacturing artificial snow comprising the steps;
 a) feeding a bulk material into a first apparatus;
 b) reducing the particle size of the bulk material in the first apparatus to produce a product;
 c) sieving the product produced at step b); and
 d) collecting the product produced at step c) for use as artificial snow.

Preferably, the bulk material is a plastics material. Preferably, the plastics material is a polyolefin.

Preferably, the bulk material is a polymer formed from one or monomers wherein at least one of the monomers comprises a mono-ethylenically unsaturated group, such as ethylene or propylene.

Most preferably, the bulk material is polyethylene. The bulk material is preferably low density polyethylene (LDPE). Most preferably, the bulk material is a closed cell non-cross-linked polyethylene foam.

Preferably, the bulk material is an expanded plastics material. Preferably, the plastics material is an expanded polyolefin.

Preferably, the bulk material is an expanded polyethylene.

Preferably, the bulk material is an expanded closed cell non-cross-linked plastics material. Most preferably, the bulk material is an expanded closed cell non-cross-linked polyethylene foam.

Preferably, the bulk material has a density of between substantially 5 and 125 Kg/m$^3$, preferably between substantially 10 and 50 Kg/m$^3$, preferably between substantially 20 and 30 Kg/m$^3$. Most preferably, the bulk material has a density of substantially 25 Kg/m$^3$.

Preferably, the bulk material is that known under the trade mark POLYLAM. Most preferably, the bulk material is that known under the trade mark POLYLAM LD. The bulk material may be that known as POLYLAM MD or POLYLAM HD.

Advantageously, the POLYLAM LD has minimal electrostatic characteristics when used in said method of manufacture of artificial snow. Therefore, an antistatic grade polyethylene is not required. In so doing, the costs of manufacture are minimised. Further, antistatic grade polyethylene is pink in colour which would render it unusable for artificial snow.

The bulk material may be that known under the trade mark JIFFYCEL.

Preferably, the product of step d) comprises substantially between 80 and 100% of bulk material. Preferably, the product of step d) comprises substantially between 90 and 100% polyethylene, most preferably substantially 100% polyethylene.

Advantageously, because the bulk material is not cross-linked while extruded, it can therefore be easily recycled and re-used. In so doing, there is minimal waste by-product from the manufacturing process which is economically desirable.

Further advantageously, the bulk material used is free from damaging fully halogenated CFC's and partially halogenated HCFC's. It is known that POLYLAM has no influence on the quality of ground water and is biologically degradable when exposed to sunlight.

A distinct advantage of the bulk material is its fire retardant characteristics. Advantageously, particularly the finer grade particle size of product, shows a reduced likelihood of ignition. Even in the event of the product combusting, it is known that POLYLAM does not produce harmful gases and only releases carbon dioxide and water vapour.

Preferably, the first apparatus is operable to granulate the bulk material. Preferably, the first apparatus is one manufactured by Blackfriars Limited, preferably known as a medium duty granulator, preferably a Blackfriars Model 40/40 apparatus.

Preferably, at least one cutting member is provided on the first apparatus, preferably being operable to cut or granulate the bulk material. Preferably, a plurality of cutting members are provided on said apparatus. Most preferably, three cutting members are provided on said apparatus. Preferably, the plurality, and most preferably, said three cutting members, are equi-distantly spaced apart. Preferably, said cutting members are spaced circumferentially about a rotating means.

Most preferably, three cutting members are provided on the first apparatus, being equi-distantly spaced apart from each other, preferably against a substantially fixed portion.

Preferably, a sieving assembly is located preferably, on the first apparatus. Preferably, the sieving assembly is located adjacent the at least one cutting member.

Preferably, the sieving assembly is operable to sieve the product produced at step b). Preferably, the sieving assembly comprises at least one sieve member. Preferably, said sieve member comprises a housing and a screen. Preferably, the screen comprises a mesh having a plurality of apertures. Preferably, the apertures or mesh size is between substantially 1 mm and 15 mm in diameter. Preferably, the apertures are substantially circular, being round hole apertures. The apertures may be rectangular or square in shape.

Preferably, a mesh size of between substantially 1 mm and 3 mm diameter, most preferably substantially 2 mm, is used when making "Superfine" artificial snow.

Preferably, a mesh size of between substantially 3 mm and 5 mm diameter, most preferably substantially 4 mm, is used when making "Fine" artificial snow.

Preferably, a mesh size of between substantially 4 mm and 6 mm diameter, most preferably substantially 5 mm, is used when making "Standard" artificial snow.

Preferably, a mesh size of between substantially 5 mm and 7 mm diameter, most preferably substantially 6 mm, is used when making "Medium" artificial snow.

Preferably, a mesh size of between substantially 7 mm and 9 mm diameter, most preferably substantially 8 mm, is used when making "Coarse" artificial snow.

Preferably, a mesh size of between substantially 10 mm and 14 mm diameter, most preferably substantially 12 mm, is used when making "Oversized" artificial snow.

Preferably, the sieving assembly is manufactured from metal material. Most preferably, said assembly is manufactured from mild steel.

Preferably, a device operable to cause a reduction in the fluid flow through the assembly is provided. Preferably, said device is located downstream of an exit flow of first apparatus. Preferably, the device is at least one cyclonic apparatus. Most preferably, one cyclonic apparatus is provided downstream of the first apparatus, preferably being downstream of a fan.

Preferably, the cyclonic apparatus is operable to create an area of low pressure in the fluid flow, preferably being operable to reduce the speed of flow of material leaving the first apparatus. In so doing, material or product produced at step c) flows in a substantially controlled manner out of the cyclonic apparatus, to be collected at step d).

Preferably, a collecting means is provided, preferably being located downstream of the cyclonic apparatus. Preferably, the collecting means is manufactured from plastics material.

Preferably, the method of manufacture of artificial snow as hereinbefore described, is operable as an automated process.

In a further aspect, the invention provides polyethylene for use as an artificial snow.

Advantageously, the artificial snow produced using polyethylene more closely resembles natural snow. The artificial snow has desirable fluid flow characteristics which allows said snow to fall in a similar manner to that of natural snow, for example, the artificial snow may fall as a light flurry or can be caused to fall as a blizzard. Further, the colour of the artificial snow is substantially white and substantially maintain this colour without yellowing.

In a further aspect, the invention provides the use of polyethylene in the manufacture of artificial snow.

In a further aspect, the invention provides a method of manufacturing artificial snow comprising the use of polyethylene.

All of the features described herein may be combined with any of the above aspects, in any combination.

BRIEF DESCRIPTION OF THE DRAWINGS

An embodiment of the invention will now be further described, by way of example only, with reference to the accompanying drawings, in which:

FIG. 1 shows an assembly 2 for use in the manufacture of artificial snow. The assembly 2 comprises a first apparatus 4 and a collecting chamber 6. A bulk material or feed 8 is shown and will be described in further detail below.

The preferred bulk material used in the manufacturing process is an expanded closed cell non-cross-linked polyethylene foam.

Figure 1:
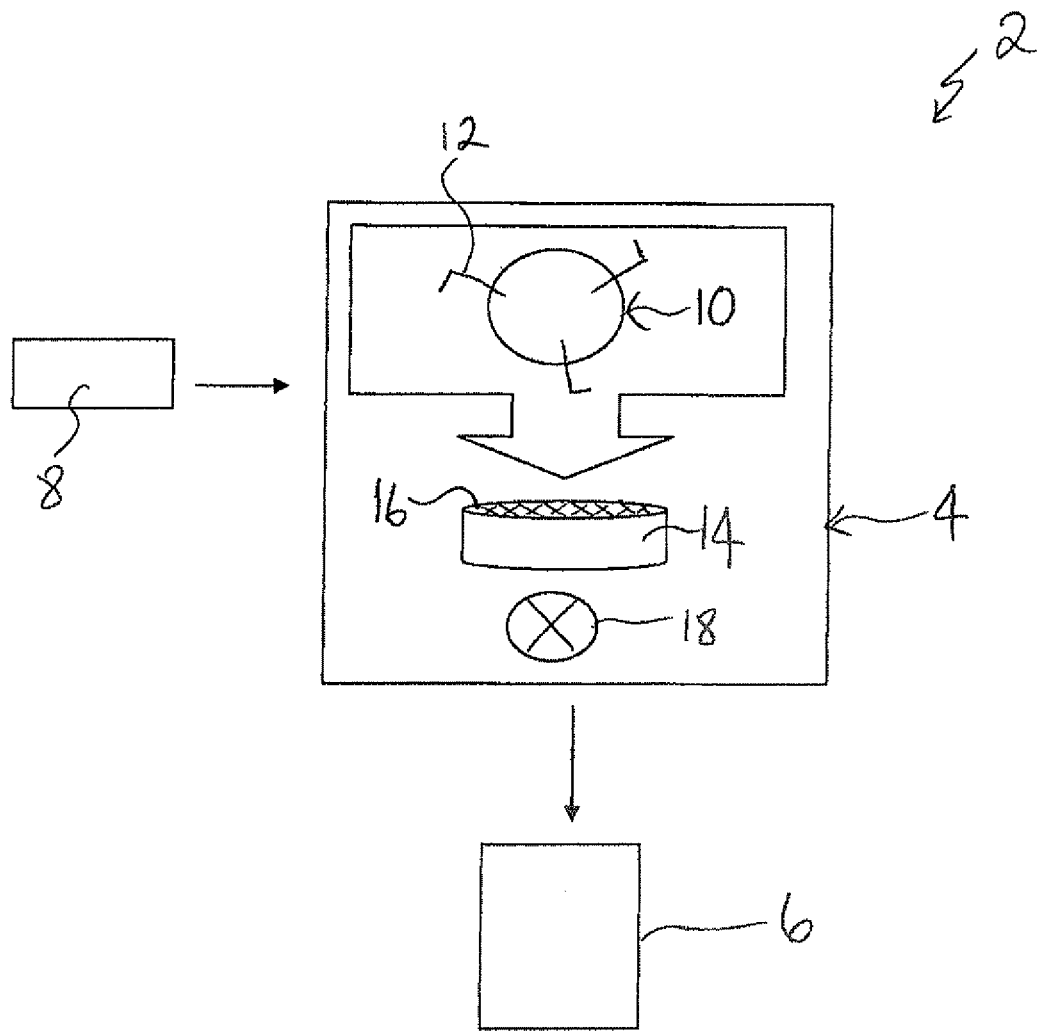
FIG. 1 shows a schematic view of an assembly for the manufacturing of artificial snow according to the invention.

The first apparatus 4 comprises an inlet through which the bulk material 8 is fed into the apparatus 2, and a cutting assembly 10. The cutting assembly 10 comprises a stator and rotor having replaceable cutting knives 12 located thereon. Three cutting knives 12 are shown in FIG. 1 being equidistantly and circumferentially spaced apart.

A sieving assembly 14 is provided below the cutting assembly 10. The sieving assembly 14 comprises a mild steel screen mesh 16. The screen mesh 16 comprises a plurality of apertures. Different sizes or diameter of aperture of the mesh are used to produce different grades of artificial snow. Round hole aperture mesh is used for all grades. Table 1 below shows the specific grades produced using various sieve mesh sizes, together with an example of the application of a particular grade product.

TABLE 1

| Grade | Sieve Mesh/ Aperture Size | Example Application |
| --- | --- | --- |
| Superfine | 2 mm | Model railway display |
| Fine | 4 mm | Falling snow (flurry) |
| Standard | 5 mm | Window dressing |
| Medium | 6 mm | Window dressing |
| Course | 8 mm | Window dressing |
| Oversize | 12 mm | Falling snow (blizzard) |

A fan 18 is provided downstream of the sieving assembly 14 to create a directional fluid flow through the apparatus 4 and to promote the sieving action of the assembly 14.

The collecting chamber 6 is provided at an outlet of the first apparatus 4. The collecting chamber 6 is in communication with the outlet so as to collect the artificial snow product leaving the apparatus 4. The collecting chamber 6 may be a suitably sized bag made from a plastics material.

Figure 2:
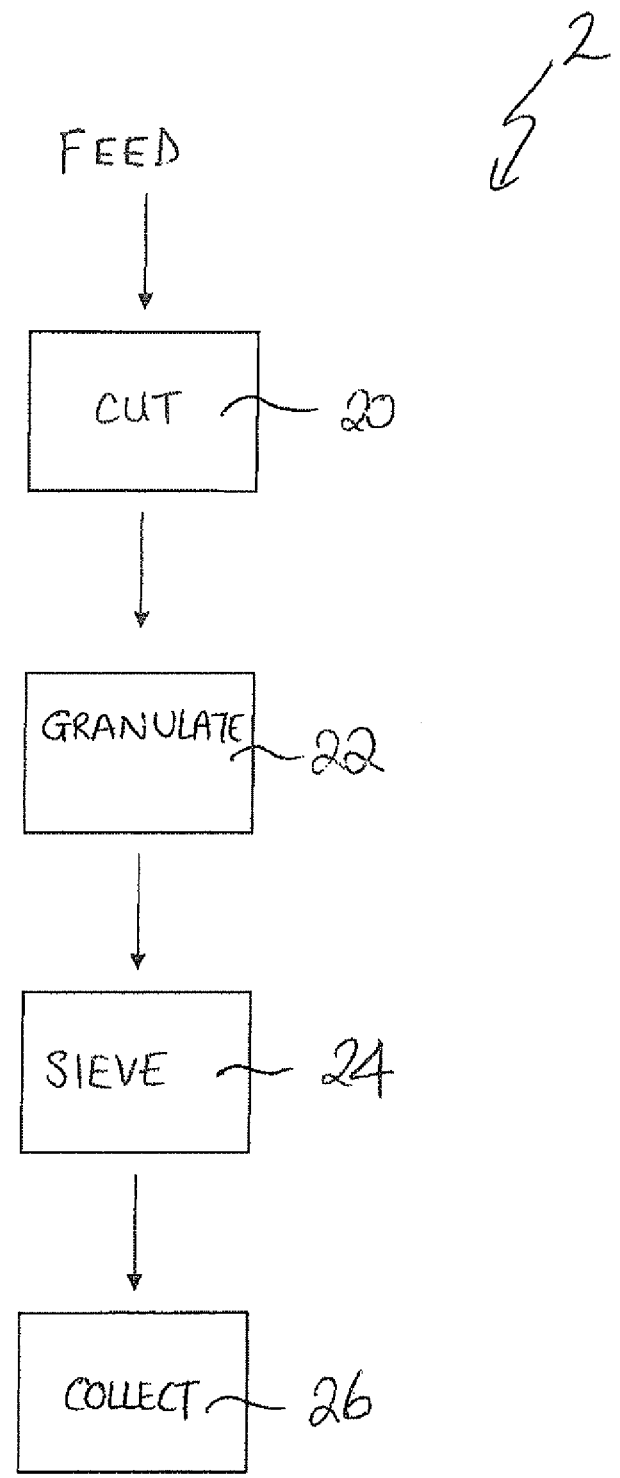
FIG. 2 shows a schematic flow diagram of a method of manufacturing artificial snow according to the invention.

As shown in the flow diagram of FIG. 2, in use, the bulk material 8 is first cut to a maximum width, most preferably 300 mm in width. The material is cut using a brandsaw. Said material 8 is then fed into the inlet of the first apparatus 4. The apparatus 4 is operable to granulate the material 8. Specifically, the material 8 contacts the cutting assembly 10 and is granulated 22. The granulated material is then directed through the sieving assembly 14, aided by the flow created by the fan 18. The sieving assembly operates to sieve a desired particle size range 24, depending on the mesh size of sieve chosen. The sieved material exits the apparatus 4 and is collected 26 in the collecting chamber 6.

Figure 3:
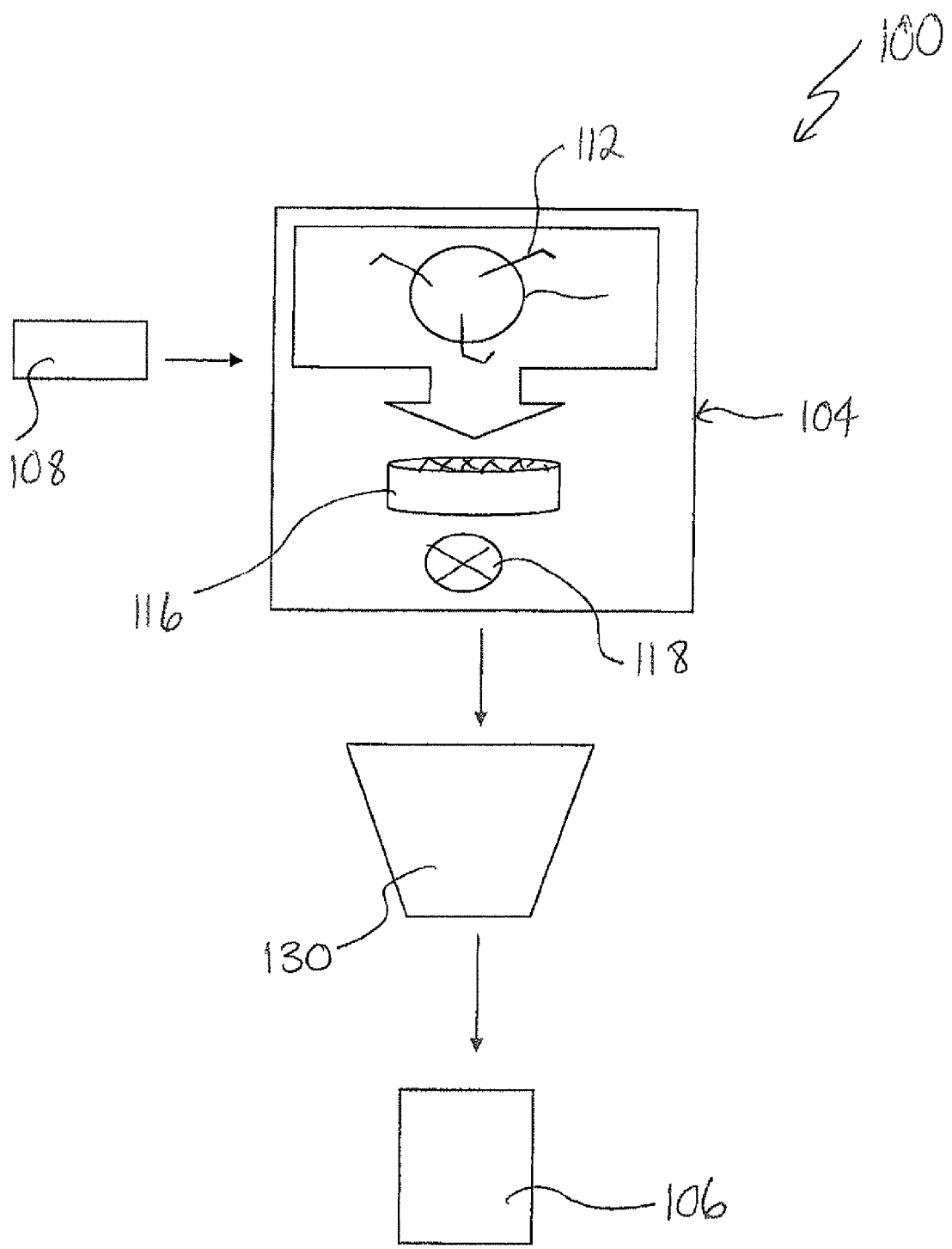
FIG. 3 shows a schematic view of an embodiment of an assembly for the manufacturing of artificial snow according to the invention.

An alternative embodiment of the invention is shown in FIG. 3. In addition to the assembly of FIG. 1, the embodiment in FIG. 2 further comprises a cyclonic device 130. In use, the sieved material exiting the apparatus 104 is directed through the cyclonic device 130 and into the collecting chamber 106. The cyclonic device 130 is operable to act as a hopper and/or a further particle size device to provide a narrower size distribution of finished material. The cyclonic device is further operable to cause a reduction in fluid flow of material exiting the sieving assembly. As such, the flow of material can be controlled.

Figure 4:
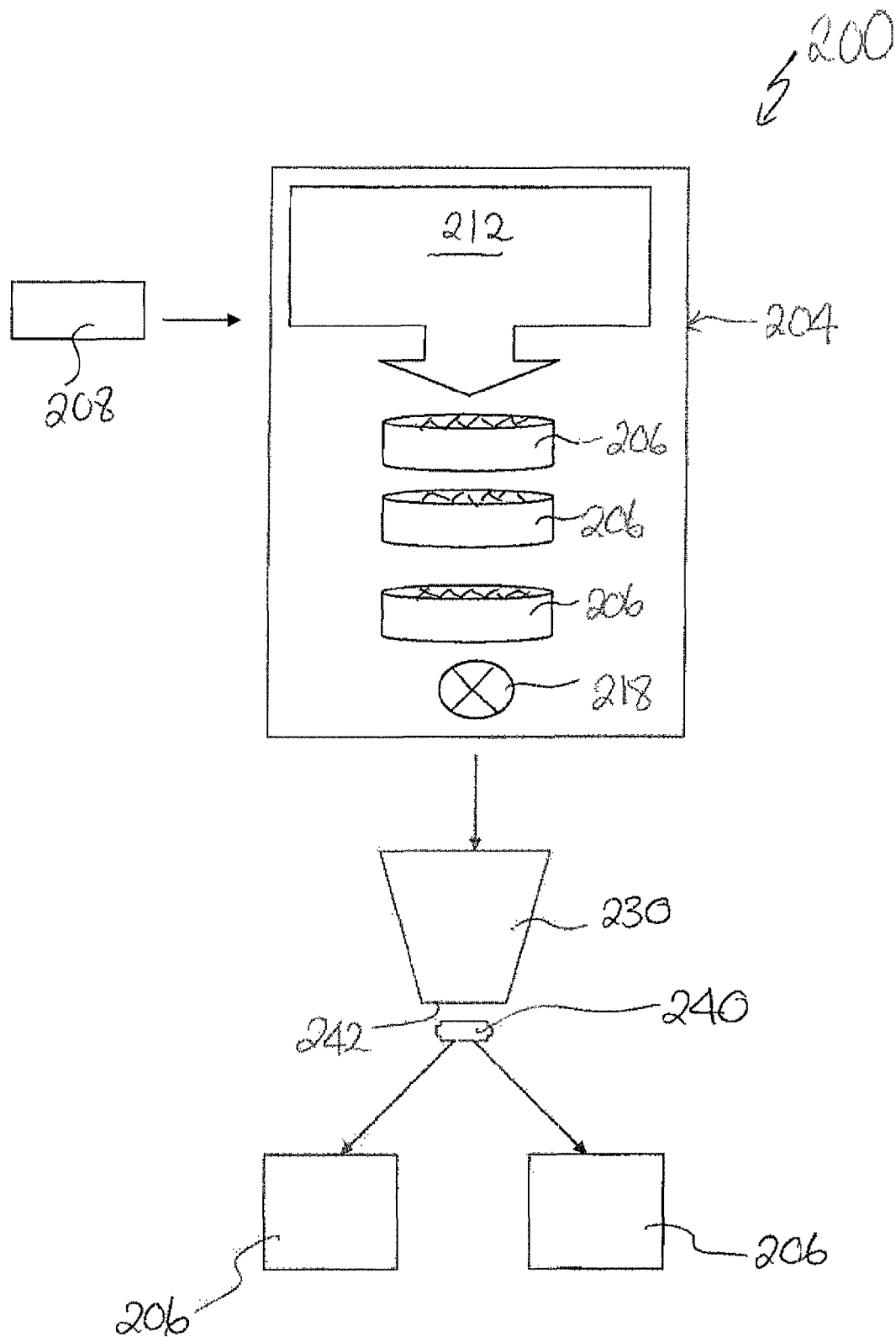
FIG. 4 shows a schematic view of a further embodiment of an assembly for the manufacturing of artificial snow according to the invention.

A further alternative embodiment of the invention is shown in FIG. 4. This embodiment has additional sieving assemblies 206. The sieving assemblies 206 may comprise a series of sieves of different mesh size to allow the grading of the material into various particle size ranges. Sieved material exiting the apparatus 4 is fed through a cyclonic device 230. A switch 240 is located at the exit 242 of the cyclonic device 230. The switch 240 is operable to close/open the exit 242. In so doing, the user can readily fill a number of collecting chambers 6.

The bulk material used in the manufacture of the artificial snow is polyethylene known under the trade name POLYLAM LD.

Advantageously, the method produces a range of grades of artificial snow product. The invention provides a method of manufacturing artificial snow which is visually realistic to natural snow. The artificial snow produced by the method has minimal electrostatic effects thus allowing the product to be easily located on a film or theatre set. Further, the artificial snow is less likely to tarnish or yellow over a period, when compared to known artificial products.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of manufacturing artificial snow comprising the steps;
    a) feeding a bulk material into a first apparatus wherein the bulk material comprises an expanded closed cell non cross-linked polyethylene foam having a density of 10 to 50 kg/m$^3$;
    b) reducing the particle size of the bulk material in the first apparatus to produce a product;
    c) sieving the product produced at step b); and
    d) collecting the product produced at step c) for use as artificial snow.

2. A method as claimed in claim 1, wherein the polyethylene is low density polyethylene (LDPE).

3. A method as claimed in claim 1, wherein the bulk material has a density of about 25 Kg/m$^3$.

4. A method as claimed in claim 1, wherein the product of step d) comprises between 80 and 100% of the bulk material.

5. A method as claimed in claim 4, wherein the product of step d) comprises substantially 100% the bulk material.

6. A method as claimed in claim 1, wherein the first apparatus is operable to granulate the bulk material.

7. A method as claimed in claim 6, wherein the first apparatus is a medium duty granulator.

8. A method as claimed in claim 1, wherein a sieving assembly is located on the first apparatus, said sieving assembly being operable to sieve the product produced at step b).

9. A method as claimed in claim 8, wherein the sieving assembly comprises at least one sieve member, said sieve member comprising a housing and a screen, the screen comprising a mesh having a plurality of apertures, wherein the apertures or mesh size is between substantially 1 mm and 15 mm in diameter.

10. A method as claimed in claim 9, wherein a mesh size of substantially 2 mm is used when making "Superfine" artificial snow.

11. A method as claimed in claim 9, wherein a mesh size of substantially 4 mm is used when making "Fine" artificial snow.

12. A method as claimed in claim 9, wherein a mesh size of substantially 5 mm is used when making "Standard" artificial snow.

13. A method as claimed in claim 9, wherein a mesh size of substantially 6 mm is used when making "Medium" artificial snow.

14. A method as claimed in claim 9, wherein a mesh size of substantially 8 mm is used when making "Coarse" artificial snow.

15. A method as claimed in claim 9, wherein a mesh size of substantially 12 mm is used when making "Oversized" artificial snow.

16. A method as claimed in claim 1, wherein a device operable to cause a reduction in the fluid flow through the assembly is provided downstream of an exit flow of the first apparatus.

17. A method as claimed in claim 16, wherein the device is a cyclonic apparatus.

18. Artificial snow manufactured according to claim 1.

* * * * *